(12) United States Patent
Castro et al.

(10) Patent No.: US 12,480,008 B2
(45) Date of Patent: Nov. 25, 2025

(54) EASY-CLEAN COATING COMPOSITIONS WITH ADDITIVES HAVING ZWITTERIONIC MOIETIES

(71) Applicant: SWIMC LLC, Cleveland, OH (US)

(72) Inventors: Stephanie L. Castro, Westlake, OH (US); Patrick K. Donovan, Parma, OH (US)

(73) Assignee: SWIMC LLC

( * ) Notice: Subject to any disclaimer, the term of this patent is extended or adjusted under 35 U.S.C. 154(b) by 827 days.

(21) Appl. No.: 17/615,288

(22) PCT Filed: Jun. 3, 2020

(86) PCT No.: PCT/US2020/035903
§ 371 (c)(1),
(2) Date: Nov. 30, 2021

(87) PCT Pub. No.: WO2020/247482
PCT Pub. Date: Dec. 10, 2020

(65) Prior Publication Data
US 2022/0363921 A1 Nov. 17, 2022

Related U.S. Application Data

(60) Provisional application No. 62/930,113, filed on Nov. 4, 2019, provisional application No. 62/857,126, filed on Jun. 4, 2019.

(51) Int. Cl.
| | |
|---|---|
| C09D 7/65 | (2018.01) |
| C09D 5/14 | (2006.01) |
| C09D 7/61 | (2018.01) |
| C09D 133/04 | (2006.01) |
| C09D 133/06 | (2006.01) |

(52) U.S. Cl.
CPC .............. *C09D 7/65* (2018.01); *C09D 5/14* (2013.01); *C09D 7/61* (2018.01); *C09D 133/04* (2013.01); *C09D 133/06* (2013.01)

(58) Field of Classification Search
CPC ....... C09D 7/65; C09D 133/14; C09D 143/02
See application file for complete search history.

(56) References Cited

U.S. PATENT DOCUMENTS

| | | | |
|---|---|---|---|
| 6,313,246 B1 | 11/2001 | Carter et al. | |
| 6,924,338 B1* | 8/2005 | Davies | A61L 27/34 |
| | | | 525/203 |
| 7,074,750 B2 | 7/2006 | Hamers et al. | |
| 7,544,401 B2 | 6/2009 | Dungworth et al. | |
| 7,879,444 B2 | 2/2011 | Jiang et al. | |
| 2004/0171515 A1 | 9/2004 | Hamers et al. | |
| 2004/0250354 A1 | 12/2004 | Hamers et al. | |
| 2005/0008795 A1* | 1/2005 | Dungworth | B41M 5/52 |
| | | | 428/32.28 |
| 2011/0282005 A1 | 11/2011 | Jiang et al. | |
| 2014/0209534 A1 | 7/2014 | Liu | |
| 2016/0083592 A1* | 3/2016 | Olsen | C09D 5/1693 |
| | | | 524/588 |
| 2016/0130450 A1* | 5/2016 | Ness | C09D 17/008 |
| | | | 524/521 |
| 2019/0023909 A1 | 1/2019 | Price et al. | |

FOREIGN PATENT DOCUMENTS

| | | | |
|---|---|---|---|
| CN | 105542607 | 5/2016 | |
| EP | 1402104 | 3/2004 | |
| EP | 1402106 | 3/2004 | |
| EP | 144867 | 4/2009 | |
| JP | 2007-2466614 A | 9/2007 | |
| WO | WO-9414897 A1 * | 7/1994 | ............ A61L 27/26 |
| WO | 2002103106 | 12/2002 | |
| WO | 2014/177159 | 11/2014 | |

OTHER PUBLICATIONS

Machine translation of CN 107353757 (original dated Nov. 17, 2017).*
He, et al. "Cleaning of Oil Fouling with Water Enabled by Zwitterionic Polyelectrolyte Coatings: Overcoming the Imperative Challenge of Oil-Water Separation Membranes" American Chemical Society, 2015, vol. 9, No. 9, 9188-9198, 11 pages.
Haung, et al. "Surface Modification for Superhydrophilicity and Underwater Superoleophobicity: Applications in Antifog, Underwater Self-Cleaning, and Oil-Water Separation" ACS Appl. Mater. Interfaces 2015, 7, 21021-21029, 9 pages.
Liu, et al. "Amino Acid-Based Zwitterionic Polymer Surfaces Highly Resist Long-Term Bacterial Adhesion" American Chemical Society, Langmuir 2016, 32, 7866-7874, 9 pages.
Ladd, et al. "Zwitterionic Polymers Exhibiting High Resistance to Nonspecific Protein Adsorption from Human Serum and Plasma" American Chemical Society, Biomacromolecules, vol. 9, No. 5, 2008, 5 pages.
Ye, et al. "Modification of Silicone Elastomer with Zwitterionic Silane for Durable Antifouling Properties" American Chemical Society, Langmuir 2014, 30, 11386-11393, 8 pages.
Min, et al. "Research and synthesis of organosilicon nonthrombogenic materials containing sulfobetaine group" Elsevier B.V., Colloids and Surfaces B: Biointerfaces 79 (2010) 415-420, 6 pages.
Bengani-Lutz, et al. "Self-Assembling Zwitterionic Copolymers as Membrane Selective Layers with Excellent Fouling Resistance: Effect of Zwitterion Chemistry" ACS Appl. Mater. Interfaces 2017, 9, 20859-20872, 14 pages.

(Continued)

*Primary Examiner* — Marc S Zimmer
(74) *Attorney, Agent, or Firm* — Honigman LLP (57) ABSTRACT

Coated articles and self- or easy-cleaning paint and coating compositions including a carrier liquid, a binder resin and additives, wherein such additives include, but are not limited to, a polymer or oligomer with at least one zwitterionic moiety. The carrier liquid is water, an organic solvent, or a combination thereof. The binder resin may be a waterborne latex, an acrylic-amino, alkyd, polyurethane, epoxy or other compatible resin. The paint and coating compositions may also contain pigment.

23 Claims, 7 Drawing Sheets

(56) References Cited

OTHER PUBLICATIONS

Knowles, et al. "Silica Nanoparticles Functionalized with Zwitterionic Sulfobetaine Siloxane for Application as a Versatile Antifouling Coating System" ACS Appl. Mater. Interfaces 2017, 9, 18584-18594, 11 pages.

Ye, et al. "Simple surface modification of a titanium alloy with silanated zwitterionic phosphorylcholine or sulfobetaine modifiers to reduce thrombogenicity" Colloids and Surfaces B: Biointerfaces 79 (2010) 357-364, 8 pages.

Chen, et al. "Study of zwitterionic sulfopropylbetaine containing reactive siloxanes for application in antibacterial materials" Colloids and Surfaces B: Biointerfaces 85 (2011) 323-329, 7 pages.

Chen, et al. "Surface hydration: Principles and applications toward low-fouling/nonfouling biomaterials" Polymer 51 (2010) 5283-5293, 11 pages.

Estephan, et al. "Zwitterion-Stabilized Silica Nanoparticles: Toward Nonstick Nano" Langmuir 2010, 26(22), 16884-16889, 6 pages.

Ye, et al. "Physical Cross-Linking Starch-Based Zwitterionic Hydrogel Exhibiting Excellent Biocompatibility, Protein Resistance, and Biodegradability" ACS Appl. Mater. Interfaces 2016, 8, 15710-15723, 14 pages.

Wu, et al. "Synthesis of a Zwitterionic Silane and Its Application in the Surface Modification of Silicon-Based Material Surfaces for Improved Hemocompatibility" Applied Materials & Interfaces, vol. 2, No. 10, 2781-2788, 2010, 8 pages.

International Search Report & Written Opinion for patent appl. No. PCT/US2020/035903, dated Sep. 3, 2020, 14 pages.

De Vera, et al. "Self-Cleaning Interfaces of Polydimethylsiloxane Grafted with pH-Responsive Zwitterionic Copolymers" Langmuir 2019, 35, 1357-1368, 12 pages.

Ilcikova, et al. "Switchable Materials Containing Polyzwitterion Moieties" Polymers 2015, 7, 2344-2370; doi:10.3390/polym7111518, 27 pages.

Liu, et al. "Transparent Grafted Zwitterionic Copolymer Coatings That Exhibit Both Antifogging and Self-Cleaning Properties" ACS Omega 2018, 3, 17743-17750, 16 pages.

European Communication with the Supplementary European Search Report issued in Application No. 2819427.4-1107 dated Jun. 20, 2023, 10 pages.

* cited by examiner

EASY-CLEAN COATING COMPOSITIONS WITH ADDITIVES HAVING ZWITTERIONIC MOIETIES

CROSS REFERENCE TO RELATED APPLICATION

This application is the National Stage filing under 35 U.S.C. 371 of International Application No. PCT/US2020/035903 filed on Jun. 3, 2020, which itself claims the benefit of U.S. provisional patent application No. 62/857,126 filed on Jun. 4, 2019, and U.S. provisional patent application No. 62/930,113 filed on Nov. 4, 2019, the entireties of which are hereby incorporated by reference.

FIELD OF THE INVENTION

This invention relates to coatings which contain an additive including at least one zwitterionic moiety, in particular a betaine, sulfobetaine, phosphatidylcholine or other functional group with permanent separation of positive and negative charges on the same moiety.

BACKGROUND

Paints and coatings typically contain four essential ingredients: carrier liquid, binder, pigment, and additives. Each of such ingredients may comprise a single component or several different items mixed into the coating.

The carrier liquid is a fluid component of the coating that serves to carry all of the other coating components. The carrier liquid is part of the wet coating and usually evaporates as the coating forms a film and dries on a surface. In latex paints, the carrier liquid is usually water. In oil-based or solvent-borne paints, the carrier liquid is usually an organic solvent. The amount and type of liquid is usually determined by features of the other coating components.

The binder component of a coating is what causes the coating to form a film on and adhere to a surface. In a latex paint, the binder comprises a latex resin, usually selected from acrylics, vinyl acrylics, or styrene acrylics. In a latex paint or coating, the latex resin particles usually are in a dispersion with water as the carrier liquid. In a solvent borne paint or coating, the binder or film forming agent comprises a resin often selected from acrylic-amino, alkyd, polyurethane, epoxy, or a number of other natural or synthesized resins.

Pigments provide the coatings with both decorative and protective features. Pigments are solid particles used to provide the coatings with various qualities, including but not limited to color, opacity, and durability. The coating may also contain other solid particles such as polyurethane beads or other solids. Pigments and other solids or extenders add bulk to the coating and their levels are related to the gloss or flatness of the coating.

A multitude of additives may be included in coatings. The additives are typically used at relatively low levels in the coating formulation, but contribute to various properties of coatings, including rheology, stability, coating performance, and application quality.

Cleaning additives may allow a paint or coating to be easily cleaned or self-cleaning of mold, mildew, dirt, grime, bio-fouling, or other undesirable material. Such additives may accomplish easy cleaning or self-cleaning by a variety of actions or mechanisms, but the most prevalent approach is to use materials that make the surface of a paint or coating hydrophobic to repel dirt, grime, and bio-fouling.

The prior art has recognized that when added to paints and coatings, materials with zwitterionic moieties, which are hydrophilic, typically bury the zwitterionic moiety in the bulk portion of the coating, since it is thermodynamically preferred to minimize surface energy, and accordingly, hydrophilic materials generally avoid the air/coating interface. Since the easy cleaning or self-cleaning effect of zwitterionic materials must occur at the surface of a coating, such materials are believed in the art to be unsuitable as cleaning additives.

Outside of the paint and coatings industry, zwitterionic materials have been used for cleaning purposes, but are not used or known in forms suitable for paint. Personal care and cleaning products incorporate small molecules with zwitterionic moieties that are readily soluble in water and stable in foams, but are, by design, easily rinsed away and thus would not be expected to provide a suitable, long-lasting cleaning effect in a usable paint or coating. In other cleaning applications, zwitterions are used with high $T_g$, rigid plastic membranes for anti-biofouling and water filtration. Such plastics are insoluble in and thus not suitable for paints and coatings.

DETAILED DESCRIPTION OF THE INVENTION

The present invention comprises, in one embodiment, a paint or coating composition comprising water, latex binder resin, pigment, and additives, wherein such additives include, but are not limited to, a polymer or oligomer with at least one zwitterionic moiety.

In another embodiment, the present invention comprises a paint or coating composition comprising an organic solvent, an acrylic-amino, alkyd, polyurethane, epoxy or other compatible resin, pigment, and additives, wherein such additives include, but are not limited to, a polymer or oligomer with a zwitterionic moiety.

In another embodiment, the invention comprises a coated article, whereby the article is coated with the zwitterionic additive-containing paint or coating compositions disclosed herein.

In some useful embodiments, the polymer or oligomer with at least one zwitterionic moiety is 0.05% to 5% by weight of the paint or coating composition. In other useful embodiments, the polymer or oligomer with at least one zwitterionic moiety is 0.1% to 4% by weight of the paint or coating composition, in other embodiments 0.5% to 3.5%, in still others 0.8% and 3%, and in still others 1% to 2.8%.

In another embodiment, the present invention comprises a paint or coating composition comprising a carrier liquid, a binder or resin, pigment, and additives, wherein the binder or resin comprises a polymer or blend of polymers with zwitterionic moieties grafted therein.

In general, zwitterionic moieties can be grafted into a polymer/oligomer backbone or trapped in a high molecular weight polymer/oligomer by entanglement. With respect to entanglement, increased molecular weight and chain entanglement work to minimize migration of zwitterions through and out of a paint/coating.

Zwitterionic moieties at the surface of a dried paint or coating film of the present, easy or self-cleaning paint/coating compositions may accomplish an effect called superhydrophilicity (or near superhydrophilicity). A superhydrophilic surface is one for which the contact angle of a hydrophilic liquid in contact with the superhydrophilic surface is zero. The contact angle refers to the angle formed at the three-phase interface between a liquid droplet on a solid surface surrounded by gas, the solid surface, and the gas. Thus, for superhydrophilic surfaces with a contact angle of zero, moisture forms thin, evenly distributed films of moisture overtop of the surface instead of forming in droplets as with non-superhydrophilic surfaces. This distributed moisture effect allows for less moisture build-up and quicker drying as moisture both sheets off of the superhydrophilic surface and accumulates in smaller amounts to begin with. Accordingly, less mildew and mold buildup is likely to occur. Additionally, any dirt or grime that is retained on the superhydrophilic surface after water is applied is evenly distributed and spread in a thin layer across the surface, rather than concentrated in the areas of beaded water droplets. On a non-superhydrophilic surface, the water may bead up, but if the bead does not roll off the surface, the dirt trapped in the water droplet is concentrated and creates a speckled, spotty appearance once dry.

Figure 1:
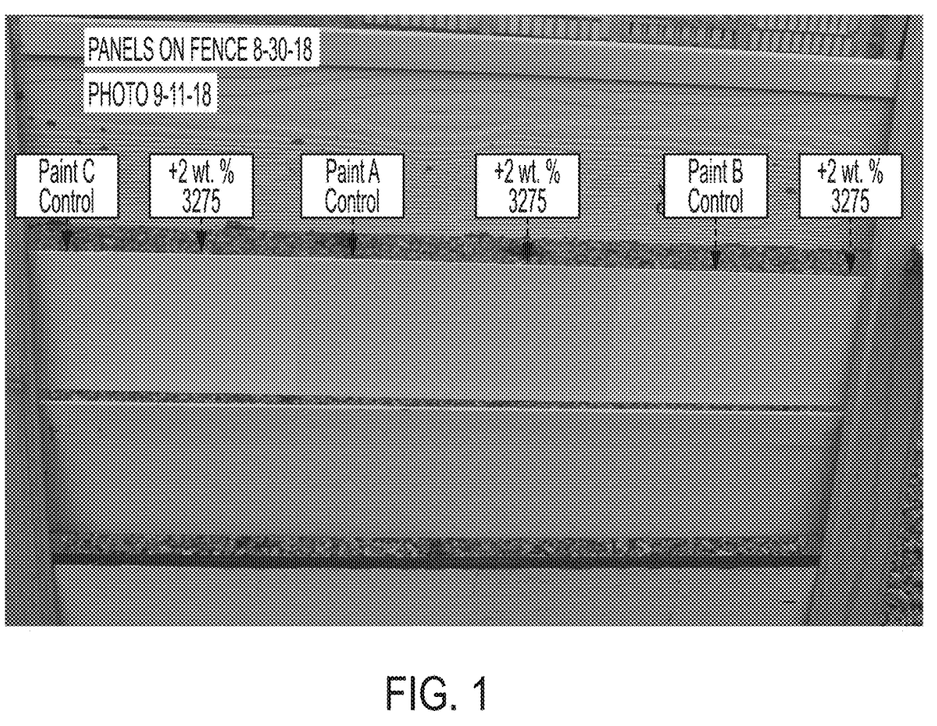
FIG. 1 shows a test panel with different paints applied in a comparative, control films and in films containing a betaine polymer additive.

FIG. 1 shows a test panel painted with control paint (labeled "CONTROL") and example paint compositions of the present inventive (labeled "+2% 3275"). Each pair of applications refers to a different base paint composition. The example paint compositions contain a polymer additive that has an acrylic polymer backbone with betaine zwitterions grafted on. This additive is present at 2% by weight of the paint composition. The addition of the additive is the only change between the control paints and their respective example paints. In FIG. 1, the control paints appear with beaded coatings of moisture with the water droplets visually evident while example paints of the present inventive compositions appear smooth and flat despite being wet.

Zwitterionic Additives

In certain embodiments of the easy or self-cleaning paint or coating composition, the composition may comprise a polymer or oligomer additive comprising a polymer backbone and at least one zwitterionic moiety. The zwitterionic additive is compatible with and/or replacing the primary resin, with appropriate surface energy to migrate to the air/coating interface, capable of coalescing at or near ambient temperatures, and persistent at the air/coating interface to repeated rinsing.

In some preferred embodiments, the polymer/oligomer backbone of the additive is synthesized to be primarily hydrophobic with an operative concentration of zwitterion such that the polymer/oligomer, when blended with a less hydrophobic polymer (e.g., a polymer binder of the inventive paint compositions), will self-stratify to the upper surface of the coating, carrying the zwitterionic portion with it. Accordingly, the superhydrophilic effect of the zwitterion can operate at the surface of the coating to yield easy clean and self-cleaning properties. This is in contrast to the tendencies of all-hydrophilic molecules or overly small molecules with zwitterion moieties, which tend to migrate to the bulk portion of a coating. The long chain polymers further act to anchor the attached or entangled zwitterion moieties so that they may be retained through multiple washings and further not migrate through the paint or coating composition throughout the coating's life. By grafting the zwitterionic material into a polymer backbone or trapping it in a high molecular weight additive by entanglement, the increased molecular weight and chain entanglement work to minimize migration of the zwitterions through and out of the coating. Additionally, the polymer/oligomer used is soluble in paint and coatings compositions, unlike the rigid plastic membranes used for anti-biofouling and water filtration. It is believed that a further advantage of the hydrophobic polymer/oligomer is that, as compared to a hydrophilic polymer/oligomer, it helps prevent entry of moisture into a dried paint or coating, thus avoiding potential issues of swelling.

The zwitterionic polymer or oligomer additive balances low and high surface energy components in the polymer or oligomer such that the zwitterions (high energy) will be carried to the surface by the low energy components of the material, but still contribute substantial high surface energy components to the surface. As described above, the zwitterionic polymer or oligomer additive further balances the molecular weight and solubility of the polymer or oligomer to be such that the material, once presented at the air/surface interface, it not easily washed away by water during a cleaning cycle. An example of a material which meets the first balance criteria but not the second is Capstone FS-50 (Chemours). This material is a low molecular weight, partially fluorinated betaine. One end of the material is fluorinated, which has very low surface energy, while the other end is a betaine, with very high surface energy. In a coating, the material concentrates at the surface of the dried coating, even when present at low concentrations (<0.5 wt % active material as a percentage of the wet paint or coating formulation) in the formulation. Coatings with Capstone FS-50 are easily rinsed of dirt. However, after the first rinsing, the effect is lost. It is assumed this small molecule is washed away. The zwitterionic polymer or oligomer additives of the present invention have both the first and the second balance, thus allowing the zwitterionic moieties to be retained and at the surface of a paint or coating to significantly improve cleansability or self-cleaning.

The polymer or oligomer backbone of the zwitterionic polymer or oligomer additives may be a linear or branched chain molecule formed from acrylic or methacrylic monomers. Various other polar and nonpolar monomers may be included provided the hydrophobic character of the polymer/oligomer backbone is maintained such that the zwitterionic polymer has the appropriate balance of disperse and polar energy that the zwitterionic moiety is retained at the surface of a coating composition. In certain embodiments, the molecular weight ($M_n$) of the polymer or oligomer additive (comprising the polymer or oligomer backbone and any zwitterionic moieties) may range from 5,000 g/mol to 80,000 g/mol, in certain other embodiments from 10,000 g/mol to 75,000 g/mol, in further embodiments 15,000 g/mol to 70,000 g/mol, and in still further embodiments 20,000 g/mol to 65,000 g/mol.

The zwitterion can be selected from the classes of betaine, sulfobetaine, phosphatidylcholine, or other functional groups with a permanent separation of positive and negative charges on the same moiety, or a mixture of these zwitterions.

The polymer or oligomer additive may have the zwitterionic moieties concentrated along one or more portions of the polymer or oligomer, or they may be randomly distributed. The molecular weight, mole fraction of zwitterion, and their distribution on the polymer or oligomer will influence the solubility of the material in the paint or coating composition as well as its surface energy. It is desirable that the additive material be able to migrate to the air/coating interface during curing or drying of the coating. As noted previously, because zwitterions have very high surface energy, the natural habit of such moieties is to bury themselves below the air/surface interface in the bulk portion of a paint or coating, as nature seeks to minimize total system surface energy by displaying low surface energy materials at the air/surface interface. The polymer or oligomer backbone acts to lower the overall surface energy of the zwitterionic additive molecule, thus allowing the zwitterion to migrate to the surface of a coating.

In certain preferred embodiments, the zwitterionic polymer or oligomer additive will be of the following structure:

wherein the zwitterion is a betaine moiety, x is anywhere from 1 to 22, 1 to 9, or preferably 2 to 3, y may be selected such that the molecular weight ($M_n$) of the polymer or oligomer is between 5,000 and 80,000 g/mol, and z is the polymer backbone chain.

In certain other preferred embodiments, the zwitterionic polymer or oligomer additive will be of the following structure:

wherein the zwitterion is a betaine moiety, w is preferably 1 or 2, x is anywhere from 1 to 22, 1 to 9, or preferably 2 to 3, y may be selected such that the molecular weight ($M_n$) of the polymer or oligomer is between 5,000 and 80,000 g/mol, and z is the polymer backbone chain.

The polymer backbone chain, z, with respect to either of the above described embodiments, may be, in certain embodiments, formed of monomers of the structure:

wherein R can be an organic fragment of $C_1$ to $C_{30}$ in length, and can include non-carbon atoms such as oxygen, nitrogen, or sulfur, and can be branched or linear. R can also be hydrogen or a functional group such as carboxylate, which may be neutralized with $H^+$ or another cation. R' can be a hydrogen or a methyl group.

In certain embodiments, the ratio of betaineacrylate/betainemethacrylate or sulfobetaineacrylate/sulfobetainemethacrylate or phosphatidylcholineacrylate/phosphatidylcholinemethacrylate units to other monomers in the polymer or oligomer can vary from 1/y to 100% (wherein 100% yields a homopolymer). In certain embodiments, the amount of zwitterion in the polymer or oligomer on a 100 g polymer or oligomer basis is about 25 mmol to about 500 mmol, in other embodiments, about 50 mmol to about 300 mmol, and in still further embodiments, about 100 mmol to about 260 mmol. In a preferred embodiment, the fraction of betaine zwitterion in the polymer or oligomer additive is expected to be in the about 200 mmol betaine/100 g polymer or oligomer.

Carrier Liquid

The easy clean or self-cleaning coating may comprise a carrier liquid prior to application to a substrate. The carrier liquid may be water, include water, or be water-based (>50% water in the carrier liquid system). The carrier liquid may further be a solvent selected rom aliphatic, cycloaliphatic and aromatic hydrocarbons such as white spirit, cyclohexane, toluene, xylene and naptha solvent, esters such as methoxypropyl acetate, n-butyl acetate and 2-ethoxyethyl acetate; octamethyltrisiloxane, or other solvents used in solvent borne systems and mixtures thereof.

Carrier liquids typically constitute 5-50% by volume of the paint or coating composition.

Binders, Other Additives, Pigments and Fillers

Paint or coatings compositions in accordance with the present invention generally comprise at least about 17%, for example, at least about 17.5% by weight, to about 55% by weight of binder polymer solids. Binders useful in latex paint and coatings compositions are known in the art and include polymeric binders, such as acrylics, vinyl acrylics, or styrene acrylics binders. Binders useful in solvent-borne paint/coating compositions are known in the art and include polymeric binders such as acrylic-amino, alkyd, polyurethane, epoxy, and a number of other natural or synthesized resins. In certain embodiments of the present invention, the zwitterionic moieties may be grafted to the polymer binder backbone or entangled in the high molecular weight polymer binder to ensure the presence of the zwitterionic moieties at the surface of a dried paint film. With respect to entanglement, increased molecular weight and chain entanglement work to minimize migration of zwitterions through and out of a paint/coating.

The surface energy balance (polar vs. disperse) of the binder or resin from which the inventive paint and coatings compositions are made also has a significant effect on the extent to which the zwitterionic polymer or oligomer additive presents at the surface of the dried paint or coating. Resins which have low values for both disperse and polar energy effectively block the migration of the additive to the surface. Resins which have an even balance of a middling amount of both disperse and polar energy allow the additive to migrate to the surface at a moderate level, and resins which have high polar and low disperse energy values (i.e. a polar:disperse energy ratio of >2) display the strongest improvement in polar surface energy after addition of the additive. Resins may thus be selected according to their surface energy balance to facilitate the easy clean/self-cleaning effect of the zwitterionic moieties attached to the resin or polymer or oligomer additives in balance with other desired properties of the resin system for a given purpose.

The easy clean or self-cleaning paint or coating composition may also include various other additives, including but not limited to thickeners, such as urethane thickeners, and acrylic thickeners in amounts up to about 10% by weight, for example about 1% to about 2%. Synthetic organic materials might also be incorporated; these include plastic beads, hollow spheres or other similar materials. Other optional components include glycols such as ethylene and/or propylene glycol in amounts up to about 7% and other solvents such as diethylene glycol dibenzoate and dipropylene glycol dibenzoate in amounts up to about 3%. The coating composition may also contain pigment dispersing agents which can be solvents or surfactants; wet paint preservatives; dry film preservatives; foam control agents such as oils, fatty acids and silicones; slip and mar additives; adhesion promoters, and/or other known paint or coating additives. The paint and coatings composition of the present invention may also comprise biocides including but not limited to metal ion containing compounds, polymeric biocides, quaternary ammonium compounds, heterocyclic compounds, phenols, organometallics, aldehydes, proteins, peroxygens, alcohols, enzymes, polypeptides, and halogen releasing compounds.

The paint composition of the present invention further comprises at least about 5% and up to about 50% by weight pigments. Such pigments may comprise inorganic pigments, such as titanium dioxide. The paint composition comprises, for example, zero percent (for an ultradeep paint), at least about 11% by weight, further for example, at least about 12% by weight, further for example, at least about 13% by weight, further for example, at least about 14% by weight, further for example at least about 15% by weight, further for example, at least about 16%, further for example at least about 17%, further for example, at least about 18%, further for example at least about 19%, and even further for example at least about 20% up to about 30% by weight titanium dioxide. In another useful embodiment, the easy clean or self-cleaning paint composition comprises more than 10% titanium dioxide. Other colored pigments or dyes may also be added to the paint, alone or in combination, to produce a wide range of colored paint. Suitable additional pigments may include calcium carbonate, talc, clay, silicates, aluminum silicates, calcium metasilicates, aluminum potassium silicates, magnesium silicates, barium sulfates, nepheline syenite, feldspar, zinc oxides or sulfides, or others known to those skilled in the art. Such additional colored pigments may be included in amounts up to about 30% by weight, for example, about 10% to about 20%. In some cases, "pigments" may also refer to functional fillers which are non-water soluble solids. Such functional fillers may include solids which provide additional functional characteristics to the paint, for example, intumescent ingredients, such as ammonium polyphosphates, melamines, pentaerythritol and similar compounds. In one useful embodiment, the coating composition of the present invention is substantially free or totally free of intumescent ingredients such as ammonium polyphosphates, melamines, and pentaerythritol and similar compounds.

The pigment volume concentration, or PVC, of a coating is the ratio of the volume of pigments (including functional fillers) to the volume of total non-volatile material (i.e. pigment and binder) present in the coating. The coating of the present invention preferably has a PVC of about 5 to about 60. In addition, the coating composition of the present invention has a maximum solids content of less than 65% by weight, for example, about 25% by weight to about 60% by weight, further for example about 30% by weight to about 58% by weight.

Paint or Coating Composition

In some preferred embodiments, zwitterionic additive weight is 0.1% to 3% of a paint or coating composition, in other embodiments 0.5% to 2.5%, in further embodiments 0.75% to 2.25%, and in still further embodiments, 1% to 2% by weight.

In certain useful embodiments, the present invention comprises a paint or coating composition comprising water, latex binder resin, pigment, and additives, wherein such additives include, but are not limited to, a polymer or oligomer with at least one zwitterionic moiety, and wherein the polymer/oligomer with at least one zwitterionic moiety is present in the paint or coating composition at 0.5% to 4% by weight. In these embodiments, cleaning effectiveness is increased by 20% to 100% as compared with control, base paints or coatings that do not contain the additive.

It should be noted that in order to make a latex paint or coatings formulation, an appropriate dispersant/surfactant system is needed in order to disperse the pigments in the formulation. The process for selecting dispersants/surfactants for paint formulations is well known to those of ordinary skill in the paint formulation art. After selecting a compatible polymer and zwitterionic additive as described herein, one of ordinary skill in the art would be able to select a dispersant/surfactant combination in order to make a desired paint or coatings composition.

EXAMPLES

Comparative, Base Paint Examples

In the following examples, base, control paint compositions that did not include zwitterionic polymer or oligomer additives were prepared according to the amounts and components described in Table 1A. Three base, control paints, each using a different binder or resin system, were used. Each was prepared by mixing the following components using techniques known to those of ordinary skill in the art:

TABLE 1A

| Material Description | Acrylate Example 1 Wt % of Paint | Acrylate Example 2 Wt % of Paint | Styrene Example 3 Wt % of Paint |
|---|---|---|---|
| Solvent[1] | | | 3.6195 |
| Solvent[2] | | | 1.6107 |
| Coalescent[3] | 0.5847 | 0.5904 | |
| Biocide[4] | 0.6043 | 0.6101 | 0.561 |
| Defoamer[5] | 0.2924 | 0.2952 | 0.2715 |
| Rheological thickener[6] | 0.4873 | 0.492 | 0.4524 |
| Proprietary Styrene Resin 3 (42% solids) | | | 54.8088 |
| Proprietary Acrylate Resin 2 (50% solids) | | 47.2333 | |
| Proprietary Acrylate Resin 1 (53% solids) | 46.7772 | | |
| Rheological thickener[7] | 0.4873 | 0.492 | 0.4524 |
| Defoamer[8] | 0.2924 | 0.2952 | 0.2715 |
| Dispersant[9] | 0.279 | 0.2818 | 0.2591 |
| Water | 22.3242 | 21.5669 | 13.963 |
| Ammonia | 0.1218 | 0.123 | 0.1131 |
| Pigment[10] | 5.8471 | 5.9041 | 5.4292 |
| Anti-settling agent[11] | 0.0975 | 0.0984 | 0.0905 |
| Pigment[12] | 21.4395 | 21.6486 | 18.0974 |

[1]Glycol Ether
[2]Texanol from Eastman
[3]Optifilm 400 from Eastman
[4]Biocide package
[5]Tego Foamex 810 from Evonik
[6]Aquaflow NHS 310 from Ashland
[7]Acrysol RM-8W from Dow
[8]BYK-022 from BYK
[9]Tamol 165 from Dow
[10]Minex 4 from Unimin
[11]Attagel 40 Clay from BASF
[12]TiO2 slurry from Dow One additional, base, control paint composition that did not include zwitterionic polymer or oligomer additives was prepared according to the amounts and components described in Table 1B. This base, control paint used a different binder or resin system from any of the base, control paints described in Table 1A. The base, control paint of Table 1B was prepared by mixing the following components using techniques known to those of ordinary skill in the art:

TABLE 1B

| Material Description | Acrylic & Urethane/Acrylic Hybrid Example 4 Wt % of Paint |
|---|---|
| water | 18.71 |
| Dispersant[1] | 0.9164 |
| Surfactant[2] | 0.2291 |
| Surfactant[3] | 0.275 |
| pH Adjuster[4] | 0.11 |
| Biocide[5] | 0.8496 |
| Pigment[6] | 18.3279 |
| Pigment[7] | 9.164 |
| Wax[8] | 1.6495 |
| Rheology Modifier[9] | 0.1833 |
| Solvent[10] | 2.016 |
| Solvent[11] | 0.8248 |
| Surfactant[12] | 0.3666 |
| Proprietary Acrylic Latex (49% solids) | 36.8246 |
| Defoamer[13] | 0.1834 |
| Proprietary Urethane/Acrylic Hybrid Dispersion (40% solids) | 7.9726 |
| Flow/Leveling and Slip Additive[14] | 0.3574 |
| Rheological Modifier[15] | 0.7731 |
| Rheological Modifier[16] | 0.2667 |

[1]Disperbyk-190 from BYK
[2]Triton X-405 from Dow
[3]Triton CF-10 from Dow
[4]2-amino-2-methyl-1-propanol 95 from Angus
[5]Biocide package
[6]TiO2 from Tronox
[7]Minex 10 from Unimin
[8]super taber 5506 sp5 from Shamrock
[9]Cabosil M5 from Cabot
[10]Butyl Cellosolve from Dow
[11]Butyl Carbitol from Dow
[12]Surfynol 104bc from Evonik
[13]BYK 024 from BYK
[14]Tego glide 410 from Evonik
[15]Acrysol DR-5500 from Dow
[16]Acrysol TT-615 from Dow

INVENTIVE EXAMPLES

The inventive examples were made by adding zwitterionic polymer or oligomer additives that are exemplary of the additives disclosed herein, wherein the zwitterion moieties used in these examples are betaine moieties, to the base comparative paints described above. For different applications, additives were added at 1 wt %, 2 wt %, and 3 wt % levels with respect to the weight of the base paint formulation with the added additive, coated on substrates, and dried. Surface energy analysis was carried out, and the results studied.

Figure 2A:
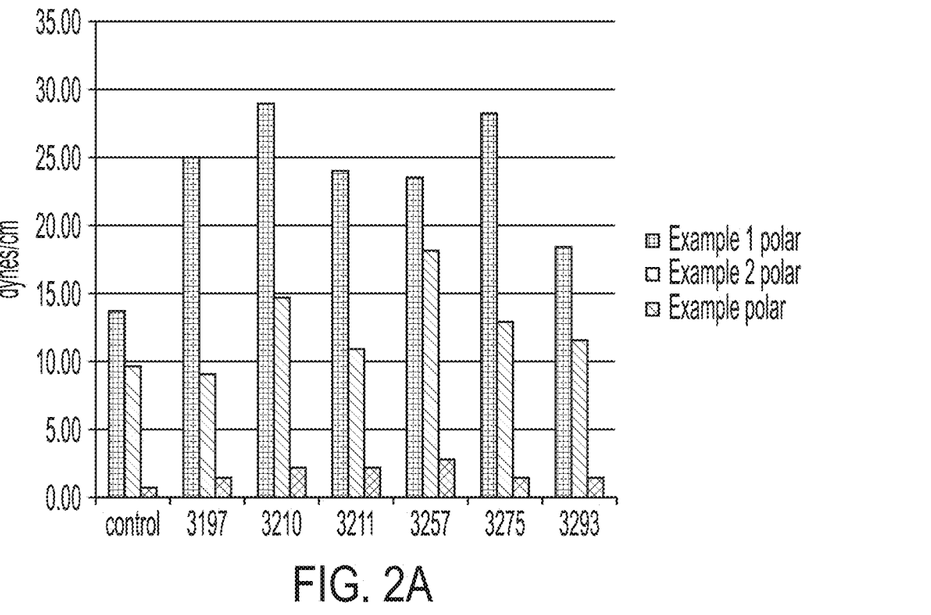
FIGS. 2A and 2B show charts indicating surface energy, the polar and disperse components, respectively, of dried paint films with betaine-containing polymer additives, relative to a comparative, control dried paint film.
Figure 2B:
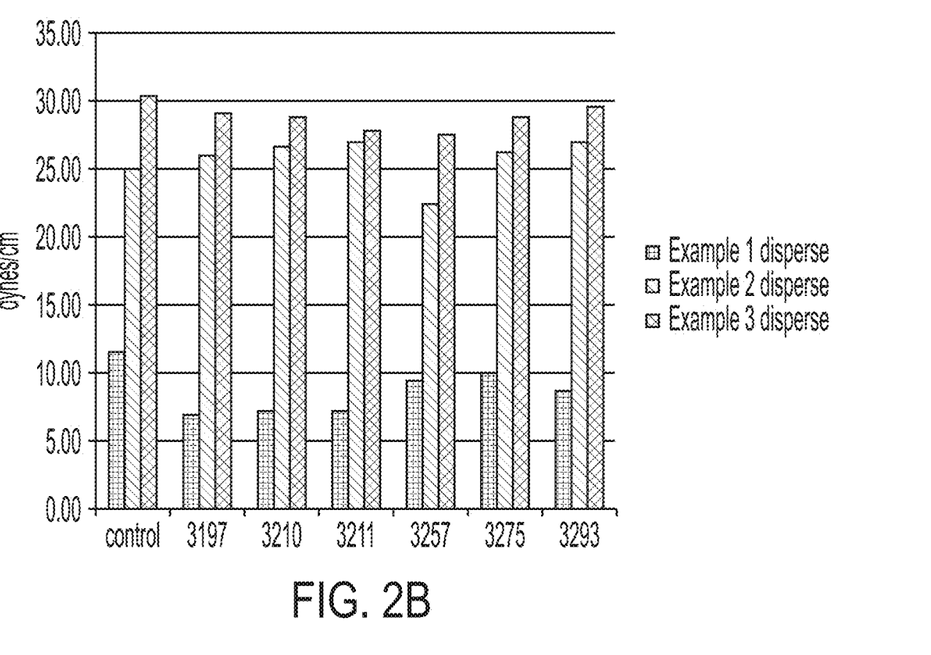

With respect to FIGS. 2A and 2B, 1 weight % of six different betaine-containing polymer/oligomer additives were each added independently to each of the three different kinds of base paint described in Table 1A. Each betaine-containing polymer/oligomer is designated along the X-axis by a four-digit number. The six different betaine-containing polymer/oligomer additives contain betaine in the amounts shown below in Table 2.

TABLE 2

| Additive | Betaine Composition (mmol betaine per 100 g polymer additive) |
|---|---|
| 3197 | 159.8 |
| 3210 | 216.1 |
| 3211 | 258.7 |
| 3257 | 162.3 |
| 3275 | 211.6 |
| 3293 | 255.7 |

The polar component of the surface energy of each exemplary paint composition and comparative base paints ("control") is shown in FIG. 2A. Relative to the control, base paint formulations, the polar component of the surface energy of the exemplary compositions generally rises, except with respect to additive 3197 in Comparative Base Paint Composition 2. The disperse component of the surface energy of each exemplary paint composition and comparative base paints ("control") is shown in FIG. 2B. Relative to the control, base paint formulations, the disperse component of the surface energy of the exemplary compositions generally falls, except with respect to almost all the additives in Comparative Base Paint Composition 2. An ideal additive raises the polar surface energy and lowers the disperse surface energy, though effective additives need not necessarily do both. Higher polar surface energy and lower disperse surface energy result in enhanced cleaning effects.

Figure 3A:
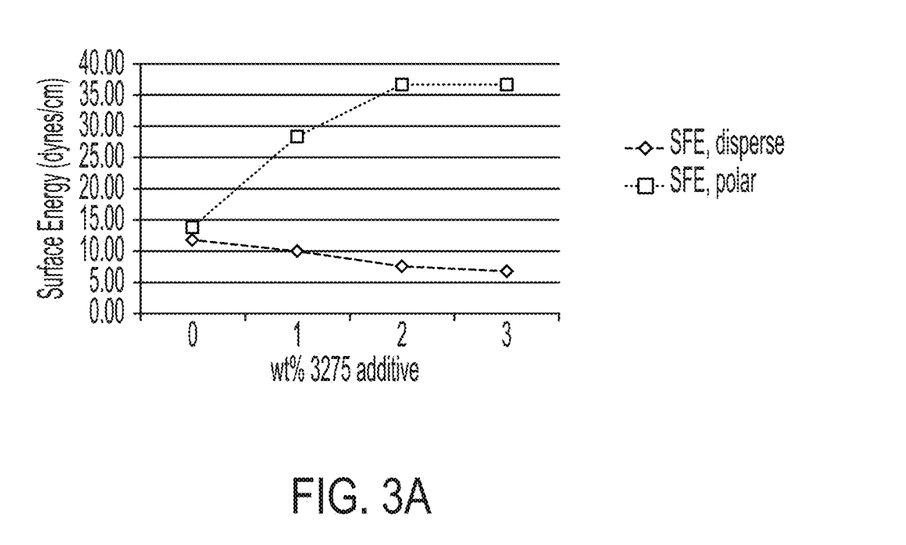
FIGS. 3A and 3B show charts each indicating surface energy, both polar and disperse components, of dried paint films with betaine-containing polymer additives relative to a comparative, control dried paint film.
Figure 3B:
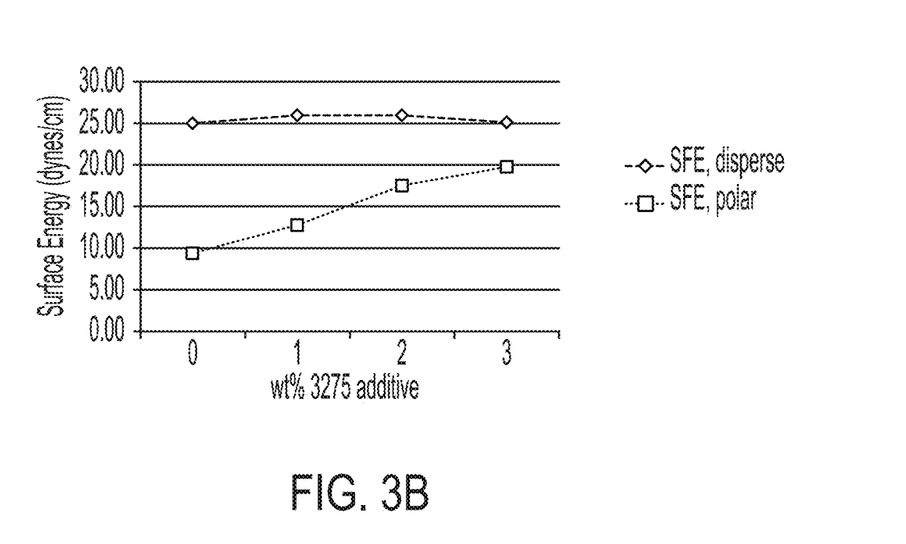

FIGS. 3A and 3B, show the polar and disperse components of comparative, base paints 1 (FIG. 3A) and 2 (FIG. 3B) with varying levels of betaine-containing polymer additive 3275 (0% to 3% additive by weight of total paint composition). Notably, the polar surface energy component appears to increase at a decreasing rate and the disperse surface energy component appears to decrease at a decreasing rate indicating there may be a saturation point with respect to the polar surface energy. This point likely varies with the additive and binder systems used.

Paint compositions as described herein were further tested for cleansibility on a coated article using a proprietary internal test method. In this method, a non-contact spectrophotometer is used to record the initial color of the panel. One gram of blended soils is applied through a sieve to a dried paint film, then the substrate is inverted to remove loose soil and the back of the panel tapped gently to dislodge weakly bound soil. The soiled area of the panel is measured again with the spectrophotometer to determine Delta E (DE) after soil. The panel is held in a panel rack under a nozzle dispensing water for 10 minutes, then dried horizontally in air at room temperature. The spectrophotometer is used to measure the final DE of the panel after washing. This is one cycle.

Figure 4A:
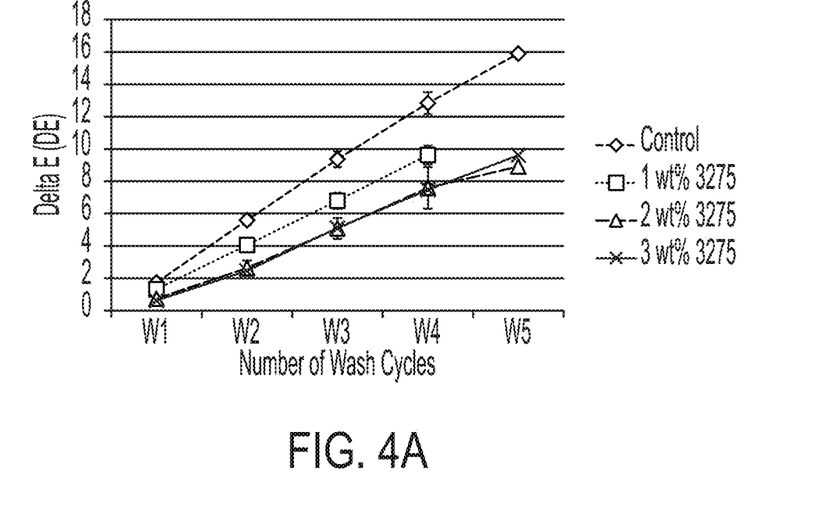
FIGS. 4A, 4B, and 4C show charts each indicating self-cleaning properties as a function of number of soil/wash cycles for test panels coated in dried paint films containing betaine polymers and comparative, control paint films.
Figure 4B:
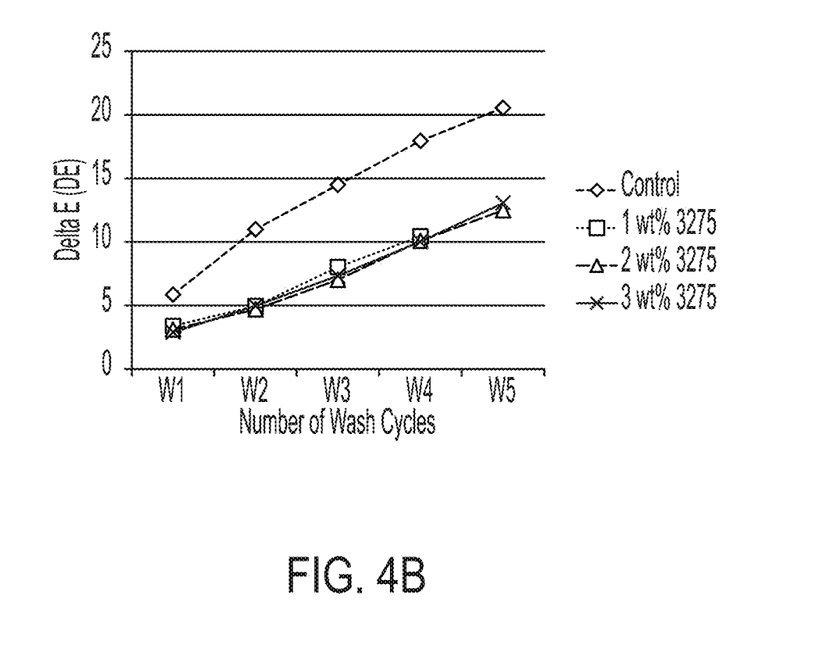
Figure 4C:
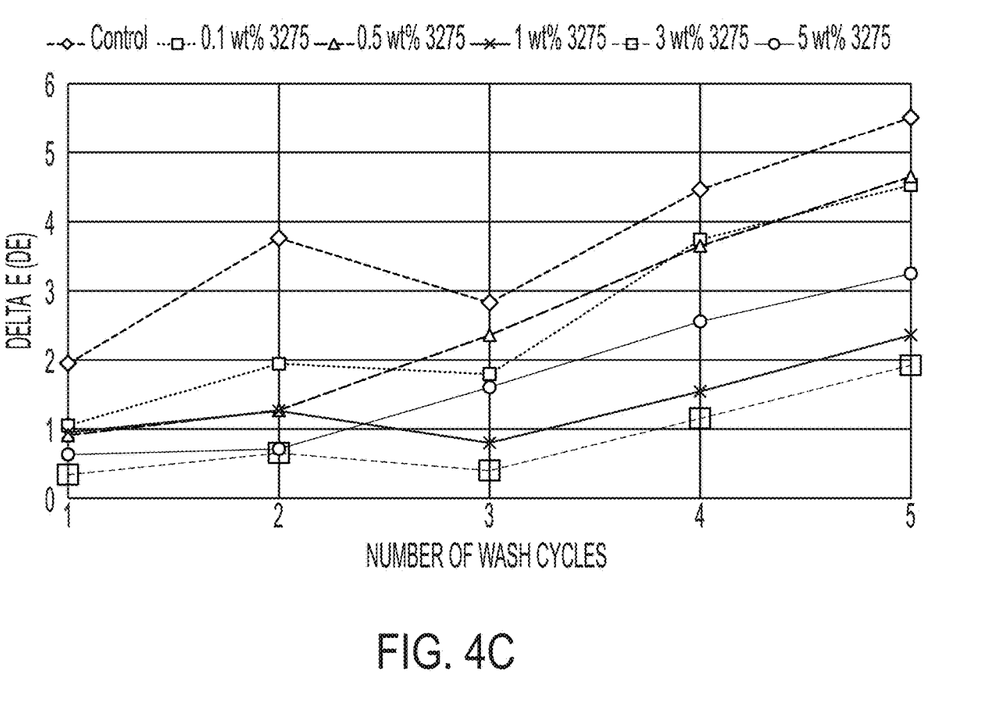

FIG. 4A shows how clean each paint composition remained as a function of soil/wash cycle for comparative, base paint composition 1 with varying levels of betaine-containing polymer additive 3275 (0% to 3% additive by weight of total paint composition). FIG. 4B shows how clean each paint composition remained as a function of soil/wash cycle for comparative, base paint composition 2 with varying levels of betaine-containing polymer additive 3275 (0% to 3% additive by weight of total paint composition). FIG. 4C shows how clean each paint composition remained as a function of soil/wash cycle for comparative, base paint composition 4 with varying levels of betaine-containing polymer additive 3275 (0% to 3% additive by weight of total paint composition). The exemplary, inventive paint compositions show improved cleansibility.

Figure 5A:
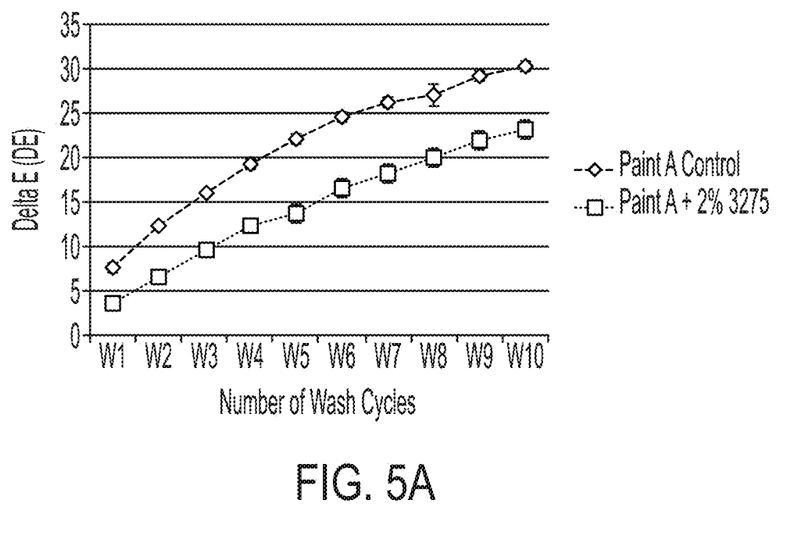
FIGS. 5A, 5B, and 5C show charts each indicating self-cleaning properties as a function of number of soil/wash cycles for test panels coated in dried commercially available paint films containing betaine polymers and comparative, control paint film.
Figure 5B:
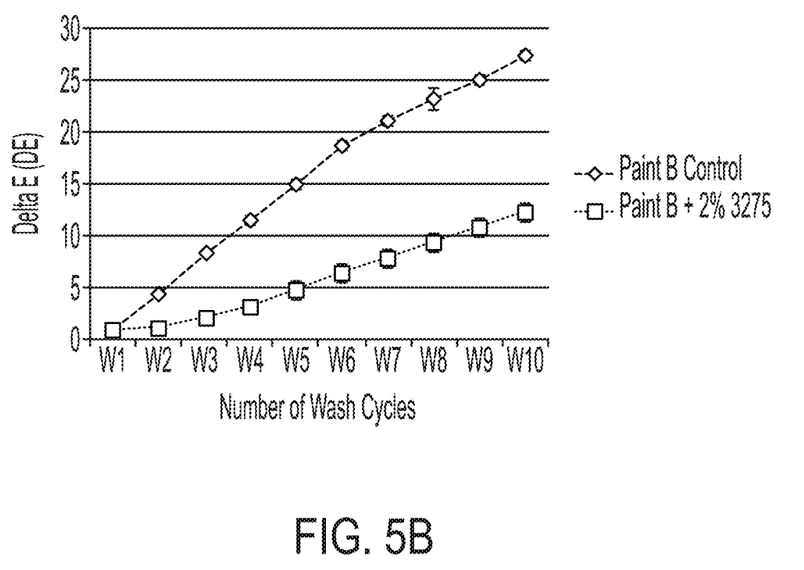
Figure 5C:
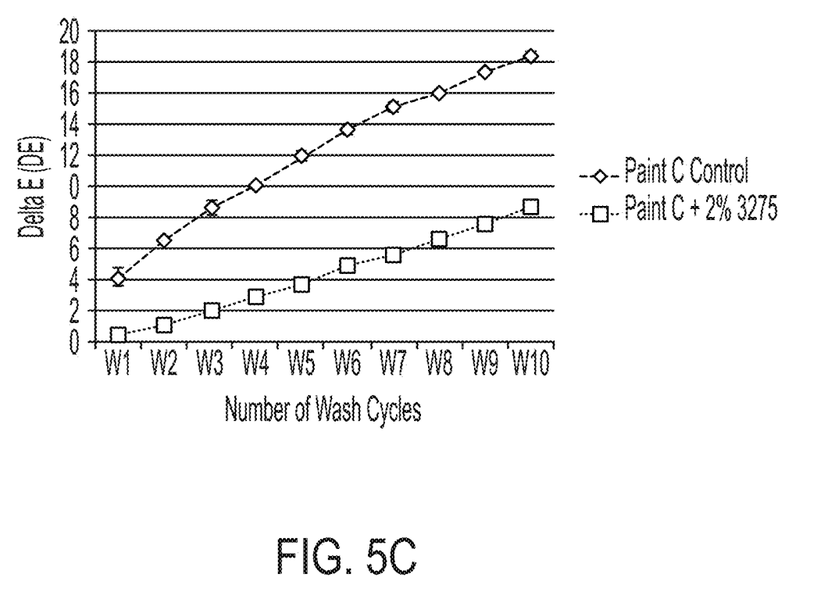

The betaine-containing polymer additive 3275 was further added to selected commercially available paints including Commercial Paint A, Commercial Paint B, and Commercial Paint C. The cleanliness of a control paint (each commercial paint as sold, without betaine-containing polymer) was compared to the same paint with an added 2% of the betaine-containing polymer additive 3275 by weight of the control paint, over 10 wash cycles. The methods described above were used to measure how clean the paints remained through soil/wash cycles after being coated on an article. FIGS. 5A-5C show lower Delta E values for the commercially available paints with the additive added even after 10 soil/wash cycles, indicating self-cleaning or easy clean performance and retention of the additive.

The invention claimed is:

1. A self-cleaning paint composition comprising:
   (a) a binder polymer; and
   (b) a polymer additive, wherein the polymer additive comprises at least one zwitterionic moiety, the polymer additive having about 25 to about 500 mmol of zwitterion per 100 grams of the polymer additive;
   (c) a carrier liquid; and
   wherein the binder polymer is less hydrophobic than the polymer additive.

2. The self-cleaning paint composition of claim 1 further comprising at least about 10% by weight of a pigment, wherein the pigment is selected from calcium carbonate, talc, clay, silicates, aluminum silicates, calcium metasilicates, aluminum potassium silicates, magnesium silicates, barium sulfates, nepheline syenite, feldspar, zinc oxides, sulfides, titanium dioxide and mixtures thereof.

3. The self-cleaning paint composition of claim 2, wherein the pigment is titanium dioxide in an amount of at least 10% by weight.

4. The self-cleaning paint composition of claim 3, further comprising at least one pigment other than titanium dioxide in an amount up to about 10% by weight.

5. The self-cleaning paint composition of claim 1, wherein the zwitterionic moiety is selected from the group consisting of betaine, sulfobetaine, phosphatidylcholine, and mixtures thereof.

6. The self-cleaning paint composition of claim 1, wherein the polymer additive comprising at least one zwitterionic moiety is present at about 0.5% to about 4% by weight.

7. The self-cleaning paint composition of claim 1, wherein the polymer additive includes a monomer unit bearing a zwitterionic moiety having the structural formula:

wherein the zwitterion moiety is a betaine moiety, x is anywhere from 1 to 22, and wherein the number average molecular weight of the polymer additive is between 5,000 and 80,000 g/mol; and wherein the polymer additive is formed of monomers of the structure:

wherein R can be hydrogen or a branched or linear organic chain of $C_1$ to $C_{30}$ in length, and R' can be a hydrogen or a methyl group.

8. The self-cleaning paint composition of claim 7, wherein x is 2 or 3.

9. The self-cleaning paint composition of claim 1, wherein the polymer additive includes a monomer unit bearing a zwitterionic moiety having the structural formula:

wherein the zwitterion moiety is a sulfobetaine moiety, w is 1 or 2, x is anywhere from 1 to 22, and wherein the number average molecular weight of the polymer additive is between 5,000 and 80,000 g/mol; and wherein the polymer additive is formed of monomers of the structure:

wherein R can be hydrogen or a branched or linear organic chain of $C_1$ to $C_{30}$ in length, and R' can be a hydrogen or a methyl group.

10. The self-cleaning paint composition of claim 1, wherein the binder polymer is present at about 7% to about 30% by weight.

11. The self-cleaning paint composition of claim 10, wherein the binder polymer is selected from acrylics, vinyl acrylics, styrene acrylics and mixtures thereof, and wherein the carrier liquid is water.

12. The easy or self-cleaning paint composition of claim 1, the paint composition further comprising a pigment dispersing agent and at least about 10% of a pigment.

13. The easy or self-cleaning paint composition of claim 12, wherein the pigment dispersing agent is a solvent or surfactant and is present at lower than about 0.5% by weight.

14. The easy or self-cleaning paint composition of claim 1, the paint composition further comprising one or more biocides selected from metal ion containing compounds, polymeric biocides, heterocyclic compounds, phenols, organometallics, aldehydes, proteins, peroxygens, alcohols, enzymes, polypeptides, quaternary ammonium compounds, and halogen releasing compounds.

15. A coated article comprising:
    (a) substrate surface; and
    (b) a self-cleaning coating on at least a portion of the substrate surface, said self cleaning coating formed from a paint composition comprising:
        a binder polymer;
        a polymer additive, wherein the polymer additive comprises at least one zwitterionic moiety, the polymer additive having about 25 to about 500 mmol of zwitterion per 100 grams of the polymer additive;
        water; and
        wherein the binder polymer is less hydrophobic than the polymer additive.

16. The coated article of claim 15, wherein a majority of the at least one zwitterionic moieties of the polymer additive are present at an exposed surface of the self-cleaning coating that is opposite the substrate surface.

17. The coated article of claim 16, wherein the polymer additive includes a monomer unit bearing a zwitterionic moiety having the structural formula:

wherein the at least one zwitterion moiety is a betaine moiety, x is anywhere from 1 to 22, y may be selected such that and wherein the number average molecular weight of the polymer additive is between 5,000 and 80,000 g/mol; and wherein the polymer additive is formed of monomers of the structure:

wherein R can be hydrogen or a branched or linear organic chain of $C_1$ to $C_{30}$ in length, and R' can be a hydrogen or a methyl group.

18. The coated article of claim 17, wherein a majority of the polymer backbone chain resides in a bulk phase of the self-cleaning coating between the substrate surface and the exposed surface.

19. The coated article of claim 16, wherein the polymer additive includes a monomer unit bearing a zwitterionic moiety having the structural formula:

wherein the zwitterion moiety is a sulfobetaine moiety, w is 1 or 2, x is anywhere from 1 to 22, and wherein the number average molecular weight of the polymer additive is between 5,000 and 80,000 g/mol; and wherein the polymer additive backbone chain is formed of monomers of the structure:

wherein R can be hydrogen or a branched or linear organic chain of $C_1$ to $C_{30}$ in length, and R' can be a hydrogen or a methyl group.

20. The coated article of claim 19, wherein a majority of the polymer backbone chain resides in a bulk phase of the self-cleaning coating between the substrate surface and the exposed surface.

21. The coated article of claim 15, wherein the zwitterionic moiety is selected from the group consisting of betaine, sulfobetaine, phosphatidylcholine, and mixtures thereof, and herein the polymer binder is selected from acrylics, vinyl acrylics, styrene acrylics and mixtures thereof.

22. The self-cleaning paint composition of claim 1, wherein the polymer additive having the at least one zwitterionic moiety has a surface energy configured to migrate to an air/coating interface of a coating to provide the self-cleaning paint composition.

23. The self-cleaning paint composition of claim 1, wherein the polymer additive is distinct from the binder polymer.

* * * * *